March 31, 1931. R. W. H. H. CRULL 1,798,312
ELECTRIC MOTOR
Filed May 3, 1926
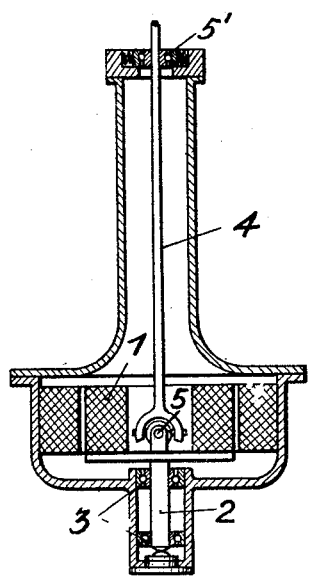
Inventor:
R.W.H.H.Crull
by Marks & Clerk
Attys.

Patented Mar. 31, 1931

1,798,312

UNITED STATES PATENT OFFICE

RENTO WOLTER HENDRIK HOFSTEDE CRULL, OF DOETINCHEM, NETHERLANDS, ASSIGNOR, BY MESNE ASSIGNMENTS, TO N. V. INTERNATIONALE SPINPOT EXPLOITATIE MAATSCHAPPIJ

ELECTRIC MOTOR

Application filed May 3, 1926, Serial No. 106,518, and in the Netherlands May 6, 1925.

When motors having a high speed of revolution are used for driving arrangements which cannot be properly balanced or only with difficulty, it is desirable to mount the driving shaft yieldingly in bearings, so that the arrangement which is driven directly by the driving shaft can adjust itself and will revolve as nearly as possible about its theoretical axis.

In the well-known driving devices the driving shaft is for this purpose divided and consists of a motor shaft lying in bearings at either end and of a shaft part hinged thereto, on which is mounted the arrangement to be driven. In order to facilitate the adjustment of the arrangement this part of the shaft is made preferably as long as possible. A disadvantage is, however, that the driving means will be relatively long and cannot be mounted anywhere with equal ease.

My invention has for its object to provide an arrangement which is considerably smaller than the arrangement of a known kind, so that it can be readily used in special machines.

According to my invention the driving shaft is connected by means of a flexible coupling to the rotor shaft, while the point of support of the rotor shaft and the unsupported end of the driving shaft lie on opposite sides of the rotor.

According to my invention the rotor is provided with a central opening and is supported on one side by a shaft running in bearings, while the flexible coupling lies between the rotor shaft and the driving shaft nearest to that side of the rotor where the latter is supported, such that the driving shaft extends into the opening in the rotor.

A further advantage of my invention consists in this, that for disposing the motor in the devices to be driven, only two bearings are required, resulting in a relatively large saving of current. In the case of small motors consuming 50 watts each bearing will account for 7-10 watts.

In the drawing, the figure represents a vertical sectional view through the device.

In the drawing, I designates the rotor supported by a shaft 2 running in bearings 3. Through an opening in the rotor the driving shaft 4 extends, which is connected to the rotor shaft 2 by means of a universal joint 5. At the other end the driving shaft runs in a yielding bearing 5', so that the shaft is capable of lateral movement.

As the oscillation of the rotor remains within exceedingly small limits, it is clear that the electric motor according to my invention will function in all positions and the motor can therefore be used vertically, horizontally or in any intermediate position, according to the purpose for which it is to be used.

The construction may be varied in many ways without departing from the spirit of the invention.

I claim:

In a vertical motor, in combination, a casing, a rotor in the casing having a central opening, a fixed bearing carried by the lower end of the casing, a yieldable bearing upon the upper end of the casing, a vertical driven shaft engaging the yieldable bearing, a driving shaft engaging the fixed bearing, means for fixing the driving shaft to the rotor, the upper end of the driving shaft and the lower end of the driven shaft being confined within the central opening of the rotor, and a universal coupling connecting the adjacent ends of said shafts, and also confined within the opening of the rotor.

In testimony whereof I affix my signature.

R. W. H. HOFSTEDE CRULL.